D. Y. & D. E. HALLOCK.
POTATO DIGGER.
APPLICATION FILED MAR. 2, 1907.
933,980.
Patented Sept. 14, 1909.
2 SHEETS—SHEET 1.
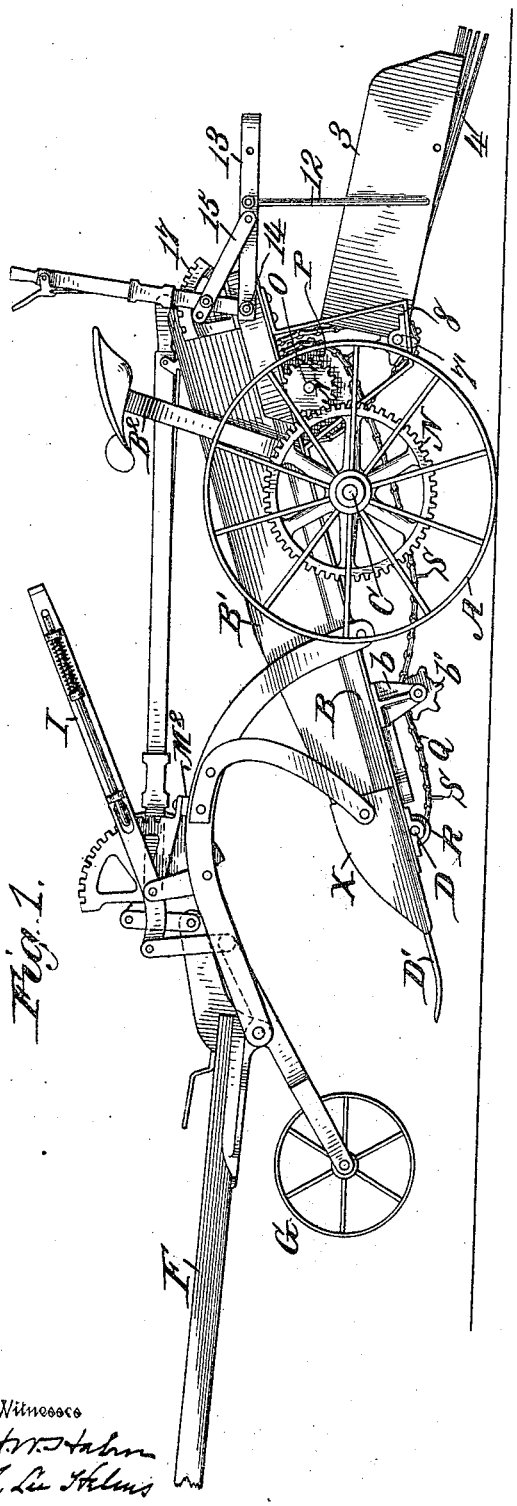
Inventors.
Daniel Y. Hallock.
Daniel E. Hallock.
Attorney
Witnesses

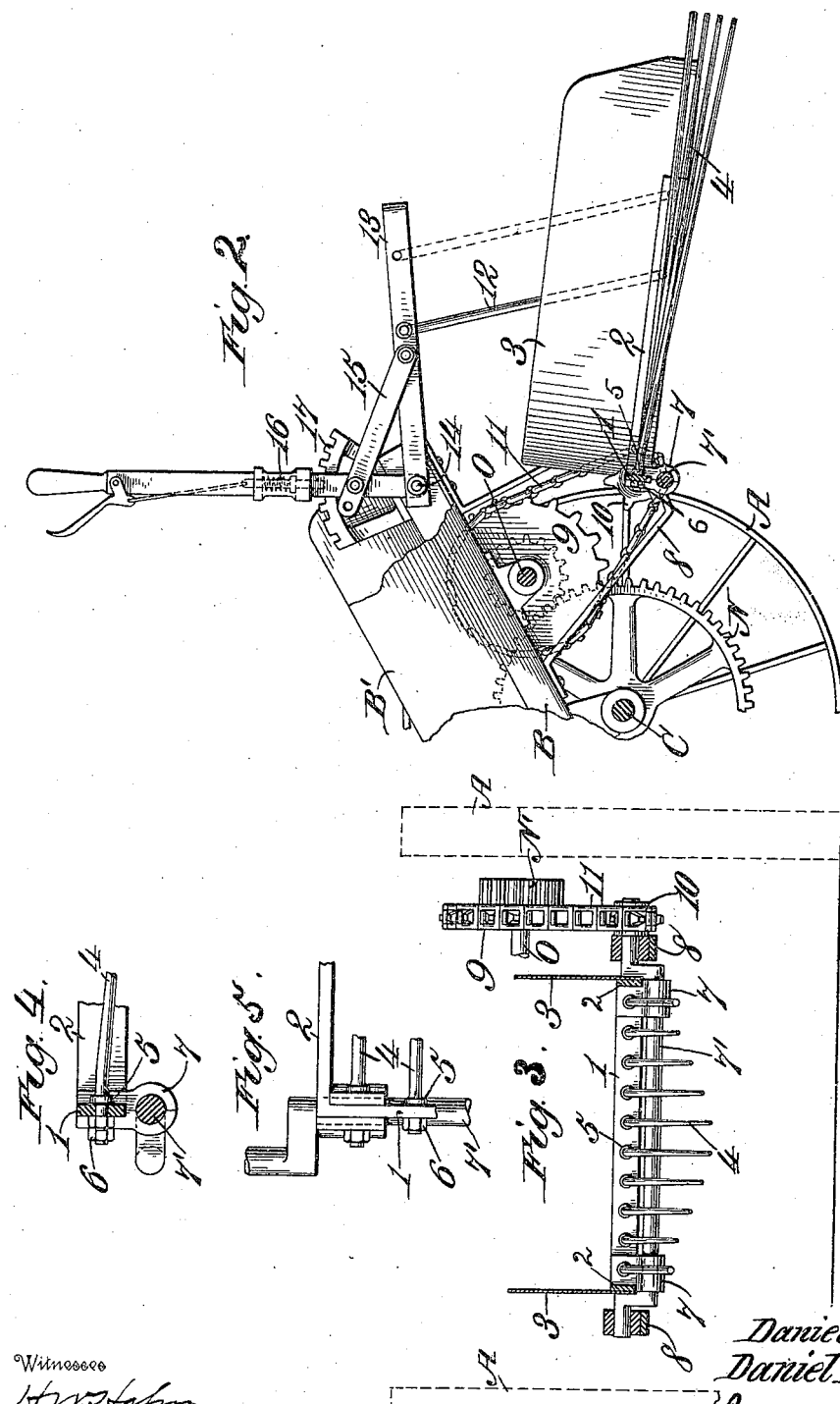

UNITED STATES PATENT OFFICE.

DANIEL Y. HALLOCK AND DANIEL E. HALLOCK, OF YORK, PENNSYLVANIA, ASSIGNORS TO A. B. FARQUHAR COMPANY, LIMITED, OF YORK, PENNSYLVANIA, A LIMITED PARTNERSHIP.

POTATO-DIGGER.

933,980.

Specification of Letters Patent. Patented Sept. 14, 1909.

Application filed March 2, 1907. Serial No. 360,194.

*To all whom it may concern:*

Be it known that we, DANIEL Y. HALLOCK and DANIEL E. HALLOCK, of York, in the county of York and State of Pennsylvania, have invented certain new and useful Improvements in Potato-Diggers, of which the following is a specification.

Our invention relates to that class of potato diggers usually designated elevator diggers, and the object is to produce a machine of this class in which light draft is combined with enhanced simplicity and efficiency of the operating mechanisms.

Our invention consists in certain improvements in the separator mechanism for separating the tubers from the soil and trash, and it has to do with the usual rear supplemental separator screen or "fork", as regards to which our invention resides in imparting to that screen, for purpose of agitation and more efficient separation, a bodily movement in both fore and aft and up and down direction coupled with a teetering movement upon a transverse horizontal axis located at a point between the two ends of the screen. This we believe to be new with us beyond its special preferred form of embodiment illustrated in said drawings.

The nature of our improvements and the manner in which the same are or may be carried into effect will be readily understood by reference to the accompanying drawings in which—

Figure 1 is a side elevation of a potato digger embodying our improvements in their preferred form, with the parts in the position they occupy with the shovel and truck or gage wheel raised above the ground. Fig. 2 is a sectional side elevation, on enlarged scale, of the rear portion of the machine, designed to illustrate more clearly the rear supplemental separator. Fig. 3 is a sectional rear end elevation of this separator showing more particularly the crank shaft on which it, at the front end, is mounted; and the sprocket gearing for operating the same. Figs. 4 and 5 are a sectional elevation and plan respectively of a detail of the supplemental separator which will be hereinafter more particularly referred to.

A A are the traction wheels and C is the main axle on which they are mounted. The main frame consists essentially of the two side bars or rails B B (preferably of angle steel) bolted rigidly at or near their front ends to the cross connecting rod or shaft D, and connected at their rear ends by the cross shaft O, on which are mounted the elevator sprocket wheels P.

The main frame is supported and can tilt or turn on the main axle, C. To the side rails are rigidly bolted front sections or castings X X to which is secured the scoop or shovel D'. Under the side rails B are secured hangers *b* in which are journaled sprocket wheels *b'* to support and take care of the sag of the endless link belts Q. The latter pass around the driven sprocket wheels P at rear, and the idle pulleys or rollers R, R at front—these rollers R, R being mounted to revolve upon the cross rod or shaft D. To the link belts are attached transverse angle bars S at suitable intervals apart, which move along over the bottom, or separator screen, serving to lift and move toward the tail of the screen the material which passes over from the shovel. Side boards B' extend lengthwise of the side rails B to hold the soil and tubers within the control of the elevator. They are bolted to the sections X X and also to the seat support B², which latter is rigidly secured to the side rails B.

The parts thus far described constitute no part of the invention claimed in this case and are illustrated and referred to merely for the purpose of illustrating an operative machine in connection with which our invention may be employed.

The draft and the lifting or adjusting mechanism of the digger may be of any usual or preferred arrangement, that which we have illustrated being of novel construction and forming the subject-matter of our patent No. 886,322, dated April 28, 1908, and filed January 16, 1908, as a division of this case. As represented F indicates the draft pole, G the truck or gage wheel for controlling the working depth of the shovel, and I the adjusting mechanism taken as a whole.

On the main axle C are master gear wheels N N which are driven by the traction wheels A A through the intermediary of the usual ratchet and pawl devices located in the meeting faces of the hubs of the gear wheels and traction wheels, adapted to drive the gear wheels only when the machine is moving forward—the pawls riding over the ratchets when the motion of machine is reversed. Devices of this kind and for use in this class of machines, are well known and require no illustration inasmuch as they form no part of our invention. The master gear wheels, engage and drive pinions N' N' fast on the shaft O on which the elevator sprocket wheels are secured.

Between the scoop or shovel D' that lifts the potatoes from the ground, and the supplemental screen at the rear of the machine there is arranged a separating screen, not shown in the drawings, over which moves the upward traveling leg or run of the endless elevator formed of the link belts Q and the cross bars S which they carry.

With this general description of the potato digger in connection with which our invention herein claimed is illustrated we will now proceed to a description of the rear supplemental screen and its operating mechanism.

The screen head is shown at 1; 2 are side arms fast to or formed in one with the screen head; 3 are side boards attached to the side arms. The bottom of the screen is formed of parallel longitudinal fingers or tines 4 which are secured at their butts or front ends to the screen head and thence extend to the rear, like the tines of a fork. The fingers are preferably drawn from tempered steel, tapering from $\frac{7}{16}$ of an inch diameter at the butt to $\frac{1}{4}$ of an inch diameter at the free end; and they are preferably secured to the screen head 1 by being passed through holes in the latter, as far as permitted by collar 5 formed on them, and then screwing upon their screw threaded ends which protrude through the head, nuts 6, which draw the collars 5 tightly against the head.

Secured to the screen head are sleeves 7 which fit upon the crank portion of the crank shaft 7', said shaft extending transversely of the machine below the rear end of the elevator and having its ends journaled in boxes carried by hangers 8 secured to the main frame. The shaft is rotated by a sprocket wheel 9 on the shaft O, from which motion is transmitted to a smaller sprocket 10 on the crank shaft by link belt 11. The screen is sustained by arms 12 pivotally connected to the sides of the screen below and the bail 13 above—the pivotal connection of the arms with the screen being preferably approximately about midway of the length of the screen so as to measurably balance the weight of the two ends of the screen thus reducing the power required to agitate it, and the screen being capable of teetering movement upon this joint as an axis. The bail 13 has pivotal connection with the rear of the main frame as indicated at 14, and upon the same axis 14 with the bail is mounted an operating lever, connected to the bail by a link 15 pivoted to the lever and bail respectively; the lever is provided with the usual spring pressed latch 16 to engage the notched quadrant 17 on the main frame. By means of this lever the vertical inclination of the screen can be varied at pleasure. Under this arrangement, when the crank shaft 7' is rotated, the screen, owing to its pivotal connection with the suspensory arms 12, will have not only a bodily fore and aft and up and down motion, but also a teetering movement upon said pivotal connection as an axis, the result being a most effective screen action, with the expenditure of comparatively little power.

We provide two or more sets of holes in the bail and screen respectively located at different distances from the rear end of the screen; the suspensory arms 12 are fitted to and engaged with the selected pair of these holes. The nearer the point of connection between these arms and the screen is to the rear end of the screen the less will be the range of teetering movement of that end. We can in this way readily grade the vertical teetering movement of the tail of the screen, as the condition of the soil in which the digger is operating may require, without changing that of the front end, or making any alteration in the gearing.

Having now described our improvements and the best way now known to us of carrying the same into practical effect, we state in conclusion that we do not restrict ourselves to the structural details hereinbefore set forth in illustration of our invention since manifestly the same can be considerably varied without departure from the spirit of the invention: but

What we claim and desire to secure by Letters Patent is as follows:

1. The supplemental screen freely suspended above the ground, the crank shaft on which the front end of the same is mounted, the main frame in which said crank shaft is supported, and the swinging screen-supporting arms having their upper ends jointed to an overhanging support attached to the main frame, and their lower ends jointed to the screen at a point between the ends of the same, and means whereby the point of attachment between the arms and the screen may be brought nearer to or farther from the free end of the screen as desired, substantially as and for the purposes hereinbefore set forth.

2. In a potato digger, the combination with means for raising the potato tubers from the ground and delivering them to a screen, of the screen suspended above the ground, means connected with the screen near its forward end for imparting to the screen fore and aft and up and down movements, a support for suspending the screen jointed to the latter on a line located approximately midway between its ends whereby the screen is caused to teeter about such support as its forward end is moved, and adjusting means whereby the range of the teetering movements may be varied, substantially as set forth.

3. In a potato digger, the combination with means for raising the potato tubers from the ground and delivering them to a screen at the rear, of a crank shaft supported in the frame of the machine and at the rear thereof, a perforated screen head extending transversely across the machine and having sleeves fitting the cranked portion of the shaft near its ends, a set of longitudinally arranged fingers each formed with a collar near one end, the end beyond the collar extending through the perforated screen-head, nuts engaging with the ends of the fingers for holding them in the screen-head, side pieces carried by the screen head, and suspending links connected with the said side pieces on a line approximately midway, lengthwise, of the screen.

In testimony whereof we affix our signatures in presence of two witnesses.

DANIEL Y. HALLOCK.
DANIEL E. HALLOCK.

Witnesses:
GLEN. J. GOODRIDGE,
EDWIN G. QUICKEL.